United States Patent [19]
Stenton

[11] Patent Number: 6,046,743
[45] Date of Patent: Apr. 4, 2000

[54] PAGE MANIPULATION FACILITY

[75] Inventor: Stuart Philip Stenton, The Myrtles, United Kingdom

[73] Assignee: Hewlett-Packard Company, Palo Alto, Calif.

[21] Appl. No.: 08/737,473

[22] PCT Filed: Jul. 28, 1994

[86] PCT No.: PCT/GB94/01627

§ 371 Date: Nov. 22, 1996

§ 102(e) Date: Nov. 22, 1996

[87] PCT Pub. No.: WO96/03686

PCT Pub. Date: Feb. 8, 1996

[51] Int. Cl.[7] .................................................. G06F 3/033
[52] U.S. Cl. ............................................................ 345/350
[58] Field of Search .................................... 345/350, 348, 345/349, 339, 351, 326, 340

[56] References Cited

U.S. PATENT DOCUMENTS

| | | | |
|---|---|---|---|
| 5,237,651 | 8/1993 | Randall | 345/350 |
| 5,283,864 | 2/1994 | Knowlton | 345/350 |
| 5,333,255 | 7/1994 | Damouth | 345/350 |
| 5,351,995 | 10/1994 | Booker | 283/117 |
| 5,438,662 | 8/1995 | Randall | 345/350 |
| 5,463,725 | 10/1995 | Henckel et al. | 345/350 |
| 5,586,245 | 12/1996 | Sugai et al. | 345/344 |
| 5,668,964 | 9/1997 | Helsel et al. | 345/350 |
| 5,870,092 | 2/1999 | Bedford-Roberts | 345/350 |

FOREIGN PATENT DOCUMENTS

| | | |
|---|---|---|
| 0483777 | 5/1992 | European Pat. Off. . |
| 9208199 | 5/1992 | WIPO . |
| 9209030 | 5/1992 | WIPO . |

OTHER PUBLICATIONS

Thompson et al., "Ease of Use is Relative", BYTE, vol. 18, No. 11, Oct. 1993, pp. 89–94.

*Primary Examiner*—Crescelle N. dela Torre

[57] ABSTRACT

The present invention relates to devices for displaying pages of electronically stored data, particularly handheld, pen-based devices. Each of the pages has a region for displaying a title. Users can move or copy displayed pages by pressing an off-screen button which causes the display to animate to show movement of the page so that the title of the page is shown skewed. When the user has selected a destination for the page, the buttton is again pressed to cause the page to be replaced in the selected destination. This invention provides a naturalistic way for users to move and copy pages in a personal information device and is particularly effective for maintaining two contexts on a small screen.

13 Claims, 2 Drawing Sheets

PAGE MANIPULATION FACILITY

TECHNICAL FIELD

The present invention relates to devices for displaying pages of electronically stored information. The present invention relates particularly, but not exclusively, to hand-held computer devices with a pen/stylus for user input and a relatively small display screen.

BACKGROUND ART

There are many known approaches to reordering of pages (and parts of pages) of electronically stored information.

Most document management applications provide a 'clipboard' to allow items to be 'cut and pasted' from one location to another via the clipboard. An example of such an application is Microsoft Windows. Traditionally the clipboard is not represented on the screen so that the user is not aware of what is on the clipboard at any given time or whether there is anything on the clipboard at all. The item which is 'cut' traditionally disappears without any indication to the user of what has happened to it.

One possibility is to display multiple full pages at the same time. For example, the screen is divided into quarters each showing a reduced-size image of a page. Reordering of pages can be achieved by moving pages between the different quarters of the screen. A disadvantage of this approach is that no page is shown to full size.

The Tandy Zoomer allows pages to be reordered from an index page. This approach has the drawback of not allowing the user to see the full contents of the pages being reordered. Furthermore, the index page needs to be accessed before page movement can occur which is rather counter-intuitive for the user.

A device for storing and displaying pages of electronic information is described in International Patent Application No. PCT/GB91/01984 (Eden Group Limited). That device is a notebook computer with a user interface which simulates a ringbinder. A user of the device is able to perform page management functions on selected pages. When a page is selected, by the user selecting a ring of the ring binder when that page is uppermost, it is shown reduced in size pending selection by the user of the particular page management function to be performed.

The shrinking of the page is not naturalistic and has the disadvantage that the shrunken page obscures the middle of the underlying page.

DISCLOSURE OF INVENTION

According to the present invention we provide a device for storing information electronically comprising a screen for displaying pages of the stored information wherein each of the pages has a region for displaying a title;

means permitting a user to manipulate a displayed page wherein the display animates to show movement of the selected page so that at least a part of the title region of the page is displayed in a skewed manner until the user replaces that page.

An advantage of the present invention is that it provides a simple naturalistic way of manipulating pages in a device for storing electronic information.

The page manipulations typically comprise moving and copying of pages. However, in one possible embodiment a device according to the present invention further comprises means for communicating with other systems and means for a user to transmit pages.

Preferably, the skewed part of the page is displayed at the bottom of the display screen. This approach is particularly effective for maintaining two contexts on a small screen.

In the embodiment to be described, a toggle action is used to initiate and complete a page manipulation according to the invention.

BRIEF DESCRIPTION OF DRAWINGS

A particular embodiment of the present invention will now be described, by way of example, with reference to the accompanying drawings in which.

BEST MODE FOR CARRYING OUT THE INVENTION & INDUSTRIAL APPLICABILITY

Figure 1:
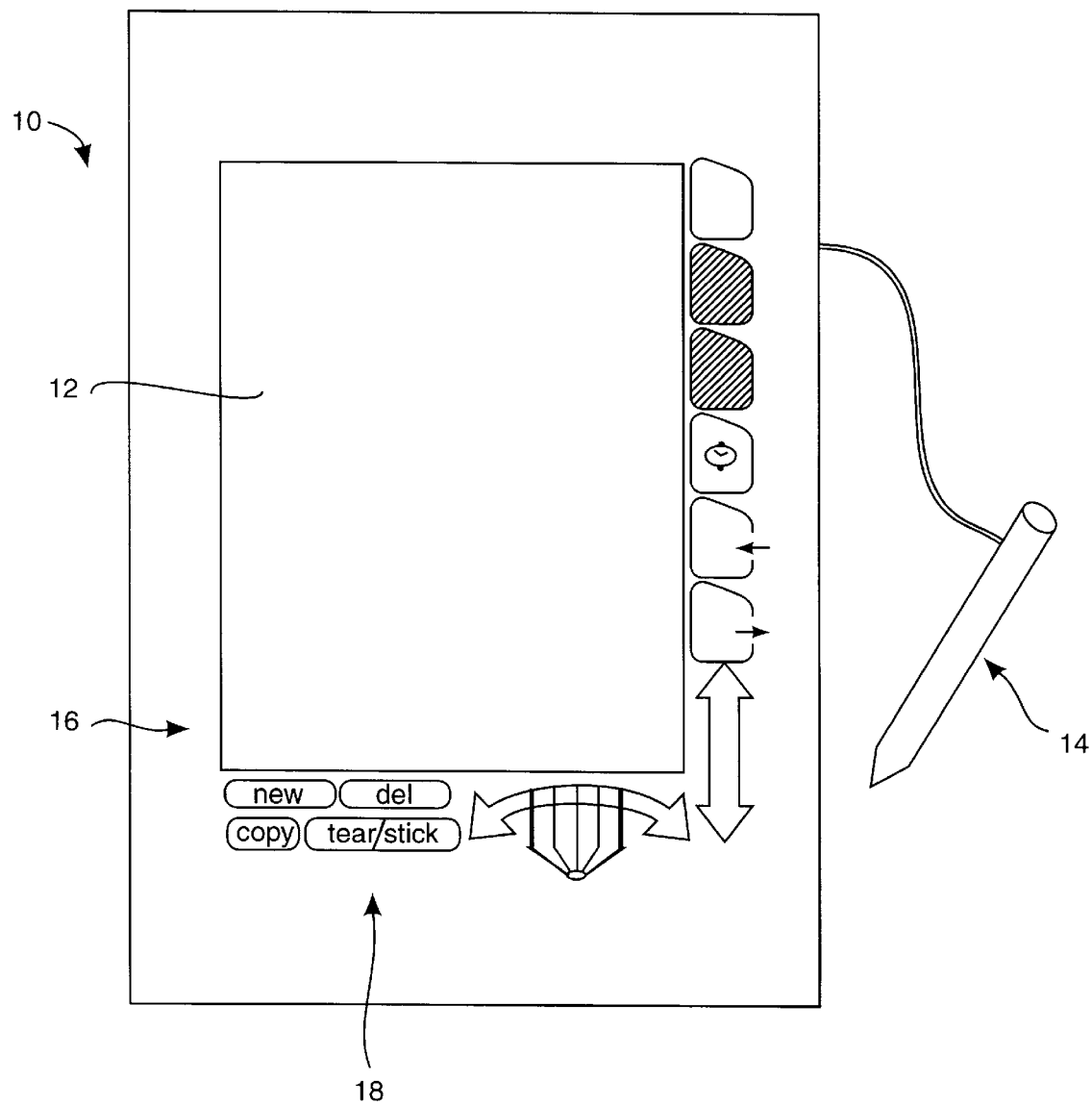
FIG. 1 is a diagram of a device implementing the present invention.

FIG. 1 shows a pen-based handheld device 10 for storing and displaying pages of electronic information comprising a display screen 12 and a pen 14 for user input. The device 10 also comprises buttons 16 for various functions (not relevant to the present invention) and a specific button 18 for enabling users to manipulate pages of stored information.

Figure 2:
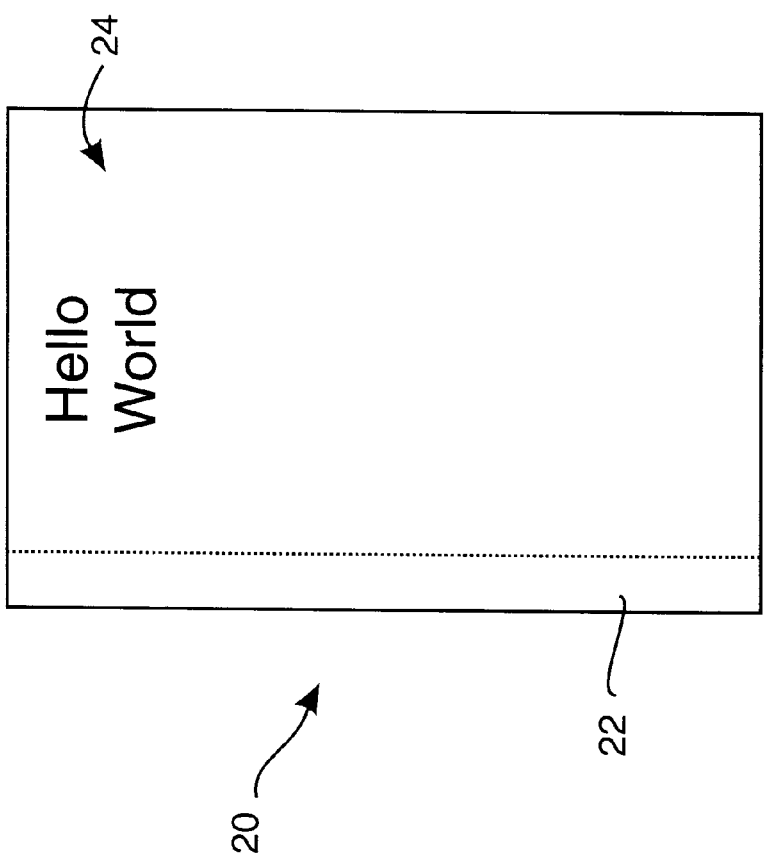
FIG. 2 is a diagram of the screen of the device of FIG. 1 showing a page in a first position.

FIG. 2 shows a page 20 being displayed which has the title "Hello World" 24 at the top. The page 20 has a left hand margin 22 which is not of relevance to the present invention.

Figure 3:
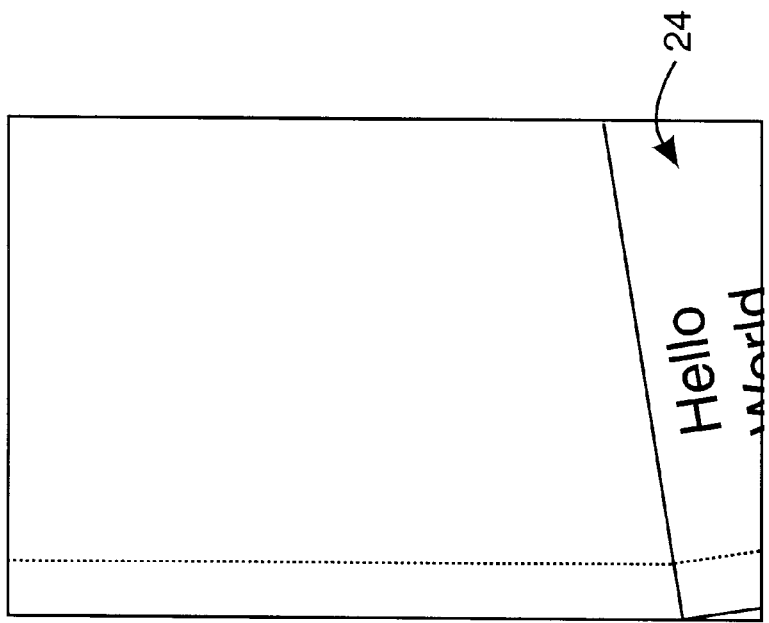
FIG. 3 is a diagram of the screen of the device of FIG. 1 showing the page of FIG. 2 in a second position.

The button 18 has a bistable action permitting pages to be selected for manipulation such as moving or deletion. If the button 18 is pressed while the page 20 is being displayed, this causes the visual representation of the page 20 to slide downwardly and to skew so that it ends up as shown in FIG. 3 with a part of the title 24 still visible. The page 20 then remains in the position shown in FIG. 3 until the user presses button 18 again to complete the manipulation. If this involves moving or copying the page 20, the user needs to select the destination of the page 20 before again pressing the button 18 to cause the page 20 to be replaced at the desired destination.

A particular implementation of the present invention in pseudo-code will now be described:

```
Tear_Page(currentPage, pageUnderneath){
    i = 0;
    yTrans = 0;
    rotation = 0;
    while(i < STEPS){
        yTrans = yTrans + YTRANS_PER_STEP;
        rotation = rotation + 1;
        Draw(pageUnderneath);
        DrawTranslatedAndRotated(currentPage, yTrans, rotation);
        i = i+1;
    }
}
Stick_Page(currentTornPage, pageUnderneath){
    i = 0;
    yTrans = YTRANS_PER_STEP*STEPS;
    rotation = STEPS;
    while(i < STEPS){
        yTrans = yTrans - YTRANS_PER_STEP;
        rotation = rotation - 1;
        Draw(pageUnderneath);
        DrawTranslatedAndRotated(currentTornPage, yTrans, rotation);
        i = i + 1;
    }
}
```

STEPS is the number of frames drawn in the animation. In this implementation the page turns one degree anticlockwise per frame. The value of STEPS in this case is 15.

The origin is at the top left of the screen and positive x and y co-ordinates extend rightward and downward.

YTRANS_PER_STEP is the amount that the page to be manipulated slips down the screen with each frame.

This is an simple but processor-inefficient implementation. Many variations are possible:

- the total rotation and translation of the page may be varied;
- the page could be rotated around the top right corner as opposed to the top left corner of the page being torn;
- the page could be rotated clockwise instead of anticlockwise;
- the above-described device represents a notepad with a spine along the top edge. Similar schemes could use a spine on other edges and have corresponding variations in translation and rotation;
- the rotation and translation parts of the motion need not occur simultaneously. For example, there may be proportionally more translation in the early frames, with rotation increasing towards the end of the movement;
- a delay could be introduced between frames to regulate the animation speed. This delay could be variable to result in a more natural motion;
- the parts of the underneath page to be exposed could be calculated and only selected regions of the underlying page could be redrawn rather than the whole page each time;
- flicker could be eliminated while constructing the various frames of the animation by swapping between different screen pages in memory;
- a simplified image of pages could be drawn during the animation. For example, solely the page edges could be drawn, or words on the page could be replaced with greyed rectangles bounding the same area, or drawing the right hand edge of the page selected for manipulation could be omitted (pretending it extends out of view);
- page manipulation could be supported by independent buttons, rather than by a bistable button as in the above-described embodiment, in which case a stack of selected pages could be accumulated;
- page manipulation could be associated with gestures over certain screen areas. For example, tapping the spine of the book, or dragging down from the top left corner could result in the page being selected for manipulation;
- the animation of a page selected for manipulation could include clipping and unclipping of a ring binder mechanism in order to indicate to the user how pages can be reinserted without dropping out. Alternatively torn edges or glue daubing could all be used to reinforce the idea of 'tearing and sticking' of pages.

I claim:

1. A device for storing electronic information in the form of electronic documents, each document comprising one or more pages of information, each page of information having a region for displaying a title, the device comprising:
   a screen for displaying a page of an electronic document; and
   a user control input facility for designating on the screen a displayed page for manipulation to change either the document of which the designated page is a part or another document, wherein upon designation of a page, the designated page display is moved across the screen so that at least a part of the region for displaying a title of the designated page is displayed until a particular manipulation of the designated page is selected, and wherein a further page may be displayed without being substantially obscured by the designated page.

2. A device according to claim 1 comprising means for a user to move and copy pages.

3. A device according to claim 2 wherein said part of the region for displaying a title of the page is displayed at the bottom of the display screen.

4. A device according to claim 2 wherein said user control input facility includes a device having a bistable action for initiating and completing page manipulation.

5. A device according to claim 1 further comprising means for communicating with other systems and means for a user to transmit pages.

6. A device according to claim 5 wherein said part of the region for displaying a title of the page is displayed at the bottom of the display screen.

7. A device according to claim 5 wherein said user control input facility includes a device having a bistable action for initiating and completing page manipulation.

8. A device according to claim 1 wherein said part of the region for displaying a title of the page is displayed at the bottom of the display screen.

9. A device according to claim 8 wherein said user control input facility includes a device having a bistable action for initiating and completing page manipulation.

10. A device according to claim 1 wherein said user control input facility includes a device having a bistable action for initiating and completing page manipulation.

11. A device according to claim 1, wherein the movement of the designated page across the screen is animated.

12. A device according to claim 1, wherein the part of the title region of the page is displayed in a skewed manner.

13. A method for storing electronic information in the form of electronic documents, each document comprising one or more pages of information, each page of information having a region for displaying a title, the method comprising the steps of:
   displaying a page of an electronic document on a screen; and
   sensing the designation of a displayed page for manipulation, wherein on designation of a page, a designated page is moved across the screen so that at least a part of the region for displaying a title is displayed until a particular manipulation of the designated page is selected, and wherein a further page may be displayed without being substantially obscured by the designated page.

* * * * *